Inventor:
Albert H. Mittag,
by Harry E. Dunham
His Attorney.

Patented Jan. 2, 1945

2,366,544

UNITED STATES PATENT OFFICE 2,366,544

ELECTRIC VALVE PROTECTIVE SYSTEM

Albert H. Mittag, Schenectady, N. Y., assignor to General Electric Company, a corporation of New York Application November 5, 1941, Serial No. 417,933

2 Claims. (Cl. 175—363)

My invention relates to electric valve protective systems and more particularly to control or protective systems for electric valve translating apparatus of the type employing immersion-ignitor control members.

It has been found that periodic or alternating voltages of peaked wave form afford a highly satisfactory way of controlling the conductivity of electric discharge devices which are required to be rendered conducting at predetermined times during cycles of voltage of an alternating current supply or load circuit. In accordance with the illustrated embodiment of my invention described hereinafter, I provide a new and improved control or protective circuit for electric valve means of the controlled type, and in which the excitation circuits are controlled in response to an abnormal operating condition to correct the faulty condition by the suppression of the peaked voltage.

It is an object of my invention to provide a new and improved electric valve circuit.

It is another object of my invention to provide a new and improved control or protective circuit for electric valve means of the controlled type.

It is a further object of my invention to provide a new and improved control or protective circuit for electric valve means of the type comprising an ionizable medium and employing an immersion-ignitor control member, and in which a voltage of peaked wave form is impressed on the control member of the electric valve means periodically in order to render the electric valve means conducting during normal operation and in which the voltage of peaked wave form is suppressed upon occurrence of an arc-back or abnormal operating condition.

Briefly stated, in the illustrated embodiment of my invention I provide new and improved protective circuits for electric valve translating apparatus wherein the conductivity of the electric valve means is controlled in response to the occurrence of an abnormal operating condition such as an arc-back of the electric valve means. Excitation circuits of the type comprising saturable inductive means are provided for normally supplying periodic voltages of peaked wave form to the immersion-ignitor control members. I provide means for suppressing the voltages of peaked wave form in response to the occurrence of the abnormal operating condition so that the electric valve means is maintained non-conducting after the occurrence of the arc-back.

Figure 1:
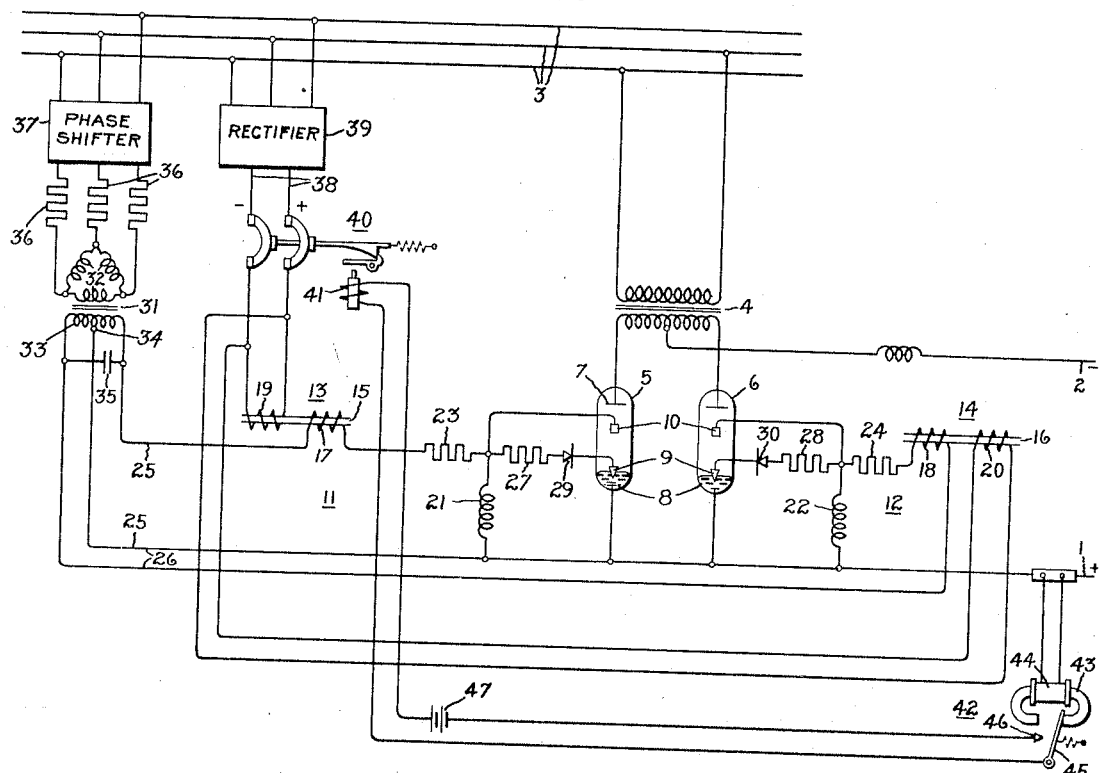
Figure 2:
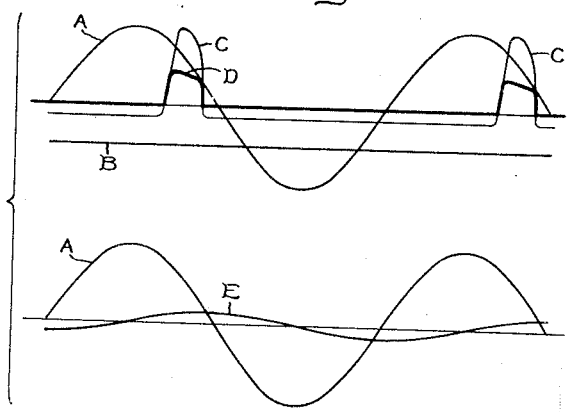

For a better understanding of my invention, reference may be had to the following description taken in connection with the accompanying drawing, and its scope will be pointed out in the appended claims. Fig. 1 diagrammatically illustrates an embodiment of my invention as applied to a rectifying system, and Fig. 2 represents certain operating characteristics of the arrangement shown in Fig. 1.

Referring now to Fig. 1 of the accompanying drawing, my invention is there diagrammatically illustrated as applied to an electric valve converting system, such as a rectifier, for supplying unidirectional current to a load circuit having a positive terminal 1 and a negative terminating 2 from an alternating current supply circuit 3. The translating apparatus which is connected between the direct current load circuit and the supply circuit 3 may comprise a transformer 4 and a plurality of electric valve means 5 and 6. While the electric valve means 5 and 6 are illustrated as being of the type employing an ionizable medium, such as a gas or a vapor, it will be appreciated that my invention in its broader aspects is not limited thereto. The electric valve means 5 and 6 are preferably of the type employing an ionizable medium, such as a gas or a vapor, and each includes an anode 7, a cathode 8, an immersion-ignitor type control member 9, and may include a transfer or relieving anode 10. The immersion-ignitor control members 9 are constructed of a material such as boron carbide or silicon carbide having an electrical resistivity relatively large compared with that of the associated mercury pool cathodes, and require the transmission of a predetermined critical value of current therethrough in order to establish an arc discharge within the electric valve means. That is, a minimum value of current is required in order to establish a cathode spot on the surface of the associated cathode.

I employ excitation circuits 11 and 12 which transmit periodic impulses of current of peaked wave form to the control members 9 of electric valve means 5 and 6, respectively. These excitation circuits may be of the type disclosed and claimed in United States Letters Patent No. 2,248,600, granted July 8, 1941 upon my joint patent application and which is assigned to the assignee of the present application. The excitation circuits 11 and 12 are similar in construction and arrangement and comprise saturable inductive devices 13 and 14, each of which includes saturable magnetic core members 15, 16, variable impedance windings 17, 18, and control means such as control windings 19, 20, respectively. Due to the unidirectional magnetization of core members 15 and 16 produced by control windings 19 and 20, the impedance of windings 17 and 18 to the flow of alternating current during positive and negative half cycles is unsymmetrical, causing an impulse of current to flow through the windings 17 and 18 during those half cycles in which the magnetization of the core members is increased by virtue of the flow of alternating current. These impulses of current are utilized to produce periodic voltages of peaked wave form by connecting suitable means, such as impedance means, in circuit with the windings 17 and 18. The impedance means may comprise inductances 21 and 22 which are connected in series relation with windings 17 and 18 through current limiting resistances 23 and 24, respectively. Alternating current is supplied to the excitation circuits 11 and 12 through suitable sources, such as circuits 25 and 26.

As a means for effecting transfer of the greater portion of the excitation current furnished by circuits 11 and 12 from the immersion-ignitor control members 9 to the relieving anodes 10, I employ resistances 27 and 28 to raise the potential of the relieving anodes upon the flow of current incident to the establishment of an arc discharge. Unidirectional conducting devices 29 and 30 are connected in series relation with control members 9 so that only unidirectional current is transmitted thereto.

Means for shifting the phase of the periodic or alternating voltage of peaked wave form produced by the excitation circuits is connected in series with the circuits 25 and 26 and may comprise a transformer 31 having primary windings 32 and a secondary winding 33. Phase compensating or adjusting means, such as a capacitance 35, may be connected across the secondary winding 33. Secondary winding 33 is provided with a neutral terminal 34 which serves as a common connection for circuits 25 and 26. Suitable impedance elements, such as resistances 36, are connected in series relation with the primary windings 32 of transformer 31 to produce variations in phase of the output voltage of secondary winding 33 upon variation in the amount of lagging reactive current transmitted through secondary winding 33 occasioned by variations in the inductive reactances of windings 17 and 18. In this manner, the phase of the periodic voltage of peaked wave form supplied to control members 9 is shifted by an amount determined by the variable angular displacement of the impedance drop across resistances 36.

A suitable phase shifting means, such as a rotary phase shifter 37, may be connected between the supply circuit 3 and the phase shifting circuit for controlling or adjusting the phase of the peaks of voltage supplied to control members 9, in this way providing an arrangement for controlling the magnitude of the voltage supplied to the direct current circuit.

To energize the control windings 19 and 20, I provide a suitable source of direct current 38 which may be energized from a suitable rectifier 39 which is in turn energized from the supply circuit 3.

I provide means for controlling the magnetization of the saturable inductive devices 13 and 14 to suppress the positive voltages of peaked wave form impressed on immersion-ignitor control members 9. More particularly, the unidirectional magnetization of the saturable inductive devices 13 and 14 is controlled or completely removed so that the periodic voltages are not produced, and so that the resultant current transmitted to control members 9 is less than the critical value of current which is required to render electric valve means 5 and 6 conducting.

I also provide means for controlling the current, or for interrupting the current, transmitted to control windings 19 and 20 in response to a predetermined operating condition of either the supply circuit or the load circuit. This predetermined electrical condition may be one which is caused by an abnormal operating condition, such as an arc-back of one of the electric valve means. A suitable circuit controlling means, such as a circuit breaker 40, may be connected between the source of direct current 38 and the control windings 19 and 20 and arranged to move to the open circuit position upon energization of an actuating coil 41 which trips the circuit breaker to the open circuit position. I employ, as a means responsive to an abnormal operating condition such as an arc-back of the electric valve means 5 and 6, a current responsive relay 42 which is responsive to the direction of current flow in the direct current load circuit 1. The relay 42 comprises a polarized core 43, an actuating coil 44, an armature 45, and a contact 46 which is engaged by the armature 45 when the current of the direct current load circuit reverses direction. A suitable source of current, such as the battery 47, may be employed as means for energizing the coil 41 of circuit breaker 40.

The operation of the embodiment of my invention shown in Fig. 1 will be explained by considering the system when it is operating as a bi-phase rectifier to transmit unidirectional current to the load circuit including conductors 1 and 2. During normal operation, the excitation circuits 11 and 12 produce periodic voltages of peaked wave form having positive impulses of substantially shorter duration and of greater magnitude than the negative portions, and serve to render the electric valve means 5 and 6 conducting a predetermined times or instants during the respective positive half cycles of applied anode-cathode voltage. The magnitude of the voltage impressed across the load circuit, of course, may be adjusted or varied by means of the phase shifter 37 which controls the time of occurrence of the positive peaks of voltage during the cycle of voltage of supply circuit 3.

The windings 17 and 18 which are energized by alternating current offer an unsymmetrical impedance during positive and negative half cycles of voltage of the sources 25 and 26. The unsymmetrical impedance is due to the unidirectional magnetization of core members 15 and 16 produced by control windings 19 and 20. When the magnetomotive forces due to windings 17 and 18 are in the same direction as that produced by windings 19 and 20, the core members 15 and 16 tend to saturate, effecting thereby a substantial reduction in the inductive reactance or flux linkages per ampere of windings 17 and 18, and, consequently, effecting a substantial decrease in impedance to the flow of current. As a result, the current through the windings 17 and 18 is of peaked form producing across inductances 21 and 22 periodic voltages of peaked wave form which are transmitted to control members 9 and 10 through resistances 27, 28 and unidirectional conducting devices 29, 30, respectively.

Upon occurrence of an abnormal operating condition, such as an arc-back, the protective system operates to suppress the voltages of peaked wave form and to decrease the voltage impressed upon or supplied to control member 9, so that the resultant current supplied thereto is less than the minimum or critical value required to render the electric valve means 5 and 6 conductive. For example, if an arc-back of one of the electric valve means occurs, the relay 42 which operates in response to the reverse current incident to arc-back, closes the circuit for energizing actuating coil 41 of circuit interrupter 40 and deenergizes the control windings 19 and 20. The removal of the unidirectional magnetomotive force impressed on core members 15 and 16 controls the windings 17 and 18 so that the impedances thereof are relatively high. Consequently, the voltage which is impressed on control member 9 is maintained at a very small value due to the small value of current which is transmitted through inductances 21 and 22. The system may be placed in operation by closing the circuit breaker 40. Relay 42 is automatically restored to the position shown in the drawing as soon as the reverse current condition is corrected so that the system is placed in condition for subsequent operation.

The operating characteristics shown in Fig. 2 may be referred to in order to explain more fully the manner in which the voltages of peaked wave form are suppressed upon occurrence of an arc-back condition. The curve A represents the voltage of circuit 25. Line B represents the unidirectional bias or unidirectional magnetomotive force impressed on core member 15 due to winding 19. Curve C represents the periodic voltage of peaked wave form which appears across the terminals of inductance 21. It is to be understood, of course, that as soon as an arc discharge is established within the electric valve means by the transmission of the positive impulses of voltage or current to the control member, the voltage actually impressed across inductance 21 is substantially decreased so that the total voltage impressed on the control member 9 will follow the heavy curve D. The voltage which is impressed on control member 9 upon the occurrence of an arc-back is represented by the curve E which, as will be noted, is a voltage of small magnitude and is caused by the flow of a relatively small value of current through the portion of excitation circuit 11 including winding 17, resistance 23 and inductance 21. Since the impedance of winding 17 is relatively high, due to the omission of the unidirectional magnetomotive force, the current will be maintained at a low value.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a supply circuit, a load circuit, electric translating apparatus connected between said circuits and comprising electric valve means having an anode, a cathode and an immersion-ignitor control member, an excitation circuit for supplying impulses of current of asymmetrical peaked wave form to said control member and comprising a source of alternating current, a saturable inductive device including an alternating current winding and a control winding, an impedance device connected in series relation with said alternating current winding and said source, and means for connecting said control member and said cathode to said impedance device, means for transmitting unidirectional current to said control winding, and means responsive to a predetermined electrical condition of one of the first mentioned circuits occasioned by arc-back of said electric valve means for effecting interruption of the current transmitted to said control winding.

2. In combination, a supply circuit, a load circuit, electric translating apparatus connected between said circuits and comprising electric valve means having an anode, a cathode and an immersion-ignitor type control member, said control member being characterized by requiring the transmission of a predetermined minimum value of current therethrough in order to establish an arc discharge between said anode and said cathode, an excitation circuit for supplying impulses of current of asymmetrical peaked wave form to said control member to render said electric valve means conducting and comprising a source of alternating current, a saturable inductive device including an alternating current winding and a control winding, an impedance device connected in series relation with said alternating current winding and said source, and means for connecting said control member and said cathode to said impedance device, means for supplying unidirectional current to said control winding, and means responsive to a predetermined electrical condition of one of the first mentioned circuits for deenergizing said control winding upon the occurrence of an abnormal operating condition of said electric valve means in order to suppress the voltage of peaked wave form.

ALBERT H. MITTAG.